United States Patent
Guen

(10) Patent No.: US 10,084,177 B2
(45) Date of Patent: Sep. 25, 2018

(54) RECHARGEABLE BATTERY HAVING SHORT-CIRCUIT MEMBER

(71) Applicant: SAMSUNG SDI CO., LTD., Yongin-si, Gyeonggi-do (KR)

(72) Inventor: Min-Hyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 623 days.

(21) Appl. No.: 14/254,854

(22) Filed: Apr. 16, 2014

(65) Prior Publication Data

US 2015/0072189 A1    Mar. 12, 2015

(30) Foreign Application Priority Data

Sep. 6, 2013    (KR) .................. 10-2013-0107516

(51) Int. Cl.
*H01M 2/34* (2006.01)
*H01M 2/26* (2006.01)

(52) U.S. Cl.
CPC ............. *H01M 2/34* (2013.01); *H01M 2/263* (2013.01); *H01M 2/345* (2013.01); *H01M 2/348* (2013.01); *H01M 2200/103* (2013.01); *H01M 2200/20* (2013.01)

(58) Field of Classification Search
CPC ....... H01M 2200/103; H01M 2200/20; H01M 2/263; H01M 2/34; H01M 2/345; H01M 2/348

See application file for complete search history.

(56) References Cited

U.S. PATENT DOCUMENTS

| 2010/0167107 | A1 | 7/2010 | Byun et al. | |
| 2010/0279156 | A1* | 11/2010 | Kim | H01M 2/0404 429/56 |
| 2011/0097613 | A1* | 4/2011 | Kim | H01M 2/043 429/53 |
| 2011/0183193 | A1* | 7/2011 | Byun | H01M 2/0426 429/178 |
| 2011/0244281 | A1 | 10/2011 | Byun | |

(Continued)

FOREIGN PATENT DOCUMENTS

EP    2 515 363 A1    10/2012
EP    2 533 326 A1    12/2012

(Continued)

OTHER PUBLICATIONS

EPO Search Report dated Oct. 27, 2014, for corresponding European Patent application 14171111.9, (11 pages).

(Continued)

*Primary Examiner* — Lingwen R Zeng
(74) *Attorney, Agent, or Firm* — Lewis Roca Rothgerber Christie LLP

(57) ABSTRACT

A rechargeable battery includes an electrode assembly including a first electrode and a second electrode; a case accommodating the electrode assembly; a cap plate coupled to the case; a terminal electrically connected to the first electrode and protruding out of the cap plate; a short-circuit member at a short-circuit opening in the cap plate and configured to deform to electrically connect the first electrode and the second electrode; and a blocking member below the short-circuit opening and having a plurality of openings.

12 Claims, 6 Drawing Sheets

(56) References Cited

U.S. PATENT DOCUMENTS

2012/0315515 A1   12/2012  Guen
2013/0004831 A1    1/2013  Byun et al.
2013/0095374 A1    4/2013  Kim

FOREIGN PATENT DOCUMENTS

| | | |
|---|---|---|
| EP | 2 581 968 A1 | 4/2013 |
| JP | 08-124554 | 5/1996 |
| KR | 10-2008-0030702 A | 4/2008 |
| KR | 10-2011-0045304 A | 5/2011 |
| KR | 10-2012-0124026 | 11/2012 |
| KR | 10-2012-0136267 | 12/2012 |
| KR | 10-2013-0003148 | 1/2013 |
| KR | 10-2013-0040577 | 4/2013 |

OTHER PUBLICATIONS

Patent Abstracts of Japan, and English machine translation for Japanese Publication 8-124554 dated May 17, 1996, (9 pages).

KIPO Notice of Allowance dated Apr. 17, 2017, for corresponding Korean Patent Application No. 10-2013-0107516 (5 pages).

KIPO Office Action dated Jul. 12, 2016, for corresponding Korean Patent Application No. 10-2013-0107516 (8 pages).

\* cited by examiner

RECHARGEABLE BATTERY HAVING SHORT-CIRCUIT MEMBER

CROSS-REFERENCE TO RELATED APPLICATIONS

This application claims priority to and the benefit of Korean Patent Application No. 10-2013-0107516 filed in the Korean Intellectual Property Office on Sep. 6, 2013, the entire contents of which are incorporated herein by reference.

BACKGROUND

1. Field

The described technology relates generally to a rechargeable battery. More particularly, the described technology relates generally to a rechargeable battery having a short-circuit member.

2. Description of the Related Art

A rechargeable battery differs from a primary battery in that it is designed to be repeatedly charged and discharged, while the latter is not designed to be recharged.

A low-capacity rechargeable battery may be used in, for example, small portable electronic devices such as mobile phones, laptop computers, and camcorders, while a high-capacity rechargeable battery may be used, for example, as a power source for driving a motor of a hybrid vehicle and the like.

A high-power rechargeable battery using a non-aqueous electrolyte of high energy density has been developed, and the high-power rechargeable battery may be formed by coupling a plurality of rechargeable batteries in series to be used as a power source for, for example, driving a motor of a device requiring a large amount of electric power, for example, an electric vehicle and the like.

In addition, a high-capacity battery module normally includes a plurality of rechargeable batteries connected in series, and a rechargeable battery may be formed in a cylindrical or prismatic shape.

When an internal pressure of a rechargeable battery, with its case made of metal and the like, is increased, for example, by abnormal reaction, the rechargeable battery may explode or catch fire.

The above information disclosed in this Background section is only for enhancement of understanding of the background of the described technology and therefore it may contain information that does not form the prior art that is already known in this country to a person of ordinary skill in the art.

SUMMARY

Accordingly, embodiments of the present invention have been designed in an effort to solve the problem described above and provide a rechargeable battery with improved safety.

According to an example embodiment, a rechargeable battery includes: an electrode assembly including a first electrode and a second electrode; a case accommodating the electrode assembly; a cap plate coupled to the case; a terminal electrically connected to the first electrode and protruding out of the cap plate; a short-circuit member at a short-circuit opening in the cap plate and configured to deform to electrically connect the first electrode and the second electrode; and a blocking member below the short-circuit opening and having a plurality of openings.

The blocking member may include a lower plate below a portion of the terminal and a blocking portion below the short-circuit member, the blocking portion may have the plurality of openings.

The rechargeable battery may also include a lower insulating member may be at an inner side of the cap plate and may be configured to insulate the cap plate from the first terminal, and the blocking member may cover an end of the lower insulating member.

A side wall may extend from both lateral sides of the lower plate and may cover lateral sides of the lower insulating member.

The rechargeable battery may also include a current collecting tab electrically connecting the terminal and the first electrode, and a protecting protrusion may extend from ends of a side wall of the blocking member past the current collecting tab.

The current collecting tab may have a fuse opening, and the lower plate may include a fusing protrusion corresponding to the fuse opening.

The blocking member may also include a connecting part connecting the blocking portion and the lower plate, and the connecting part may have a convex portion extending toward the lower plate.

The blocking portion may cover a lower surface of the short-circuit member.

A distance between the blocking portion and the cap plate may be less than a distance between the lower plate and the cap plate.

The cap plate may be electrically connected to the second electrode, the short-circuit member may be electrically connected to the cap plate, and a short-circuit tab may be electrically connected to the first electrode and may be at an upper part of the short-circuit member.

The short-circuit tab may be on the cap plate, an upper insulating member may be between the short-circuit tab and the cap plate.

The short-circuit tab may have an upper opening above the short-circuit member and may have a reinforcing protrusion around a perimeter of the upper opening and extending into the short-circuit opening.

According to another example embodiment, the rechargeable battery includes: an electrode assembly including a first electrode and a second electrode; a case accommodating the electrode assembly; a cap plate coupled to the case; a short-circuit member at a short-circuit opening in the cap plate and being configured to deform to electrically connect the first electrode and the second electrode; and a buffer member covering a lower surface of the short-circuit member and configured to buffering pressure between the short-circuit member and the case.

According to an example embodiment, because the blocking member having the plurality of openings is below the short-circuit member, an unexpected or unintended internal short-circuit due to deformation of the short-circuit member when the internal pressure of the case is abruptly changed may be prevented.

DETAILED DESCRIPTION

Figure 1:
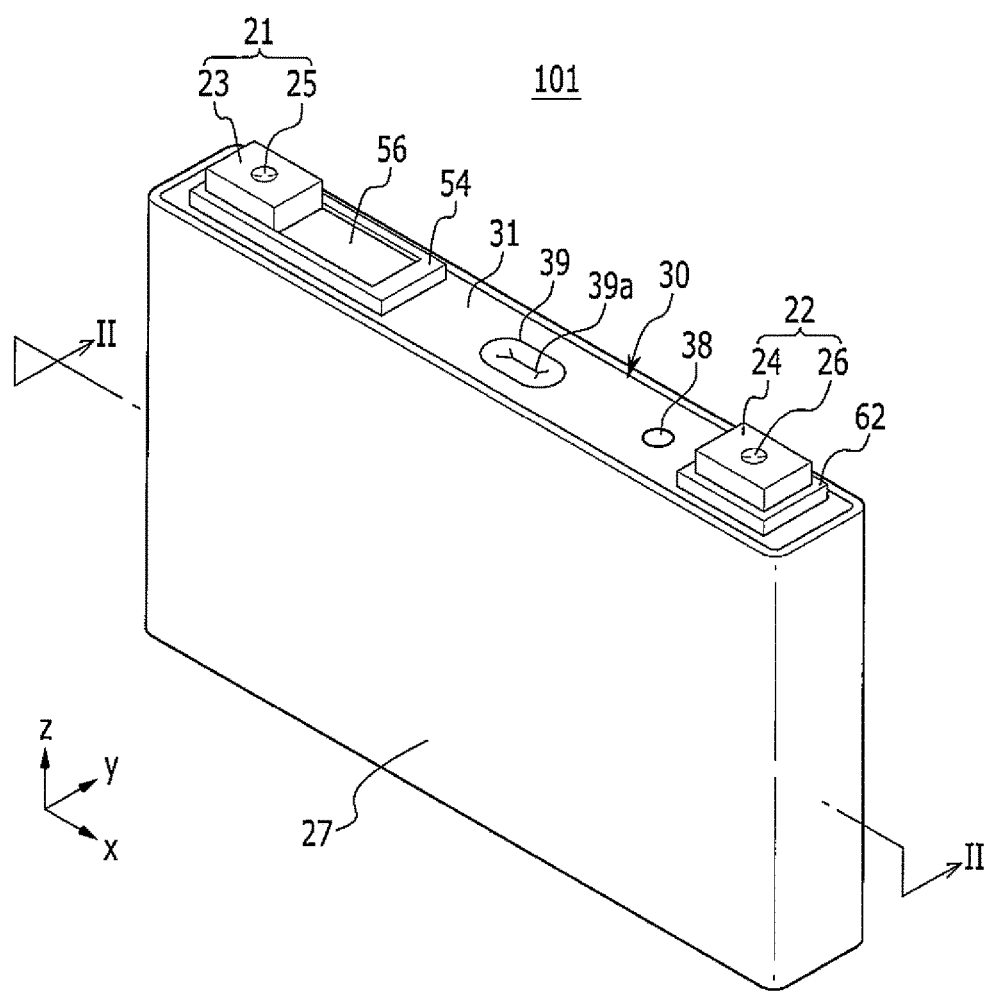
FIG. 1 is a perspective view of a rechargeable battery according to a first example embodiment.

The present invention will be described more fully hereinafter with reference to the accompanying drawings, in which example embodiments are shown.

As those skilled in the art would realize, the described embodiments may be modified in various different ways, all without departing from the spirit or scope of the present invention. Like reference numerals designate like elements throughout the specification and drawings.

It will be understood that when an element or layer is referred to as being "on" or "connected to" another element or layer, it may be directly on or connected to the other element or layer or intervening elements or layers may also be present. When an element is referred to as being "directly on" or "directly connected to" another element or layer, there are no intervening elements or layers present. As used herein, the term "and/or" includes any and all combinations of one or more of the associated listed items. Further, the use of "may" when describing embodiments of the present invention refers to "one or more embodiments of the present invention."

Figure 2:
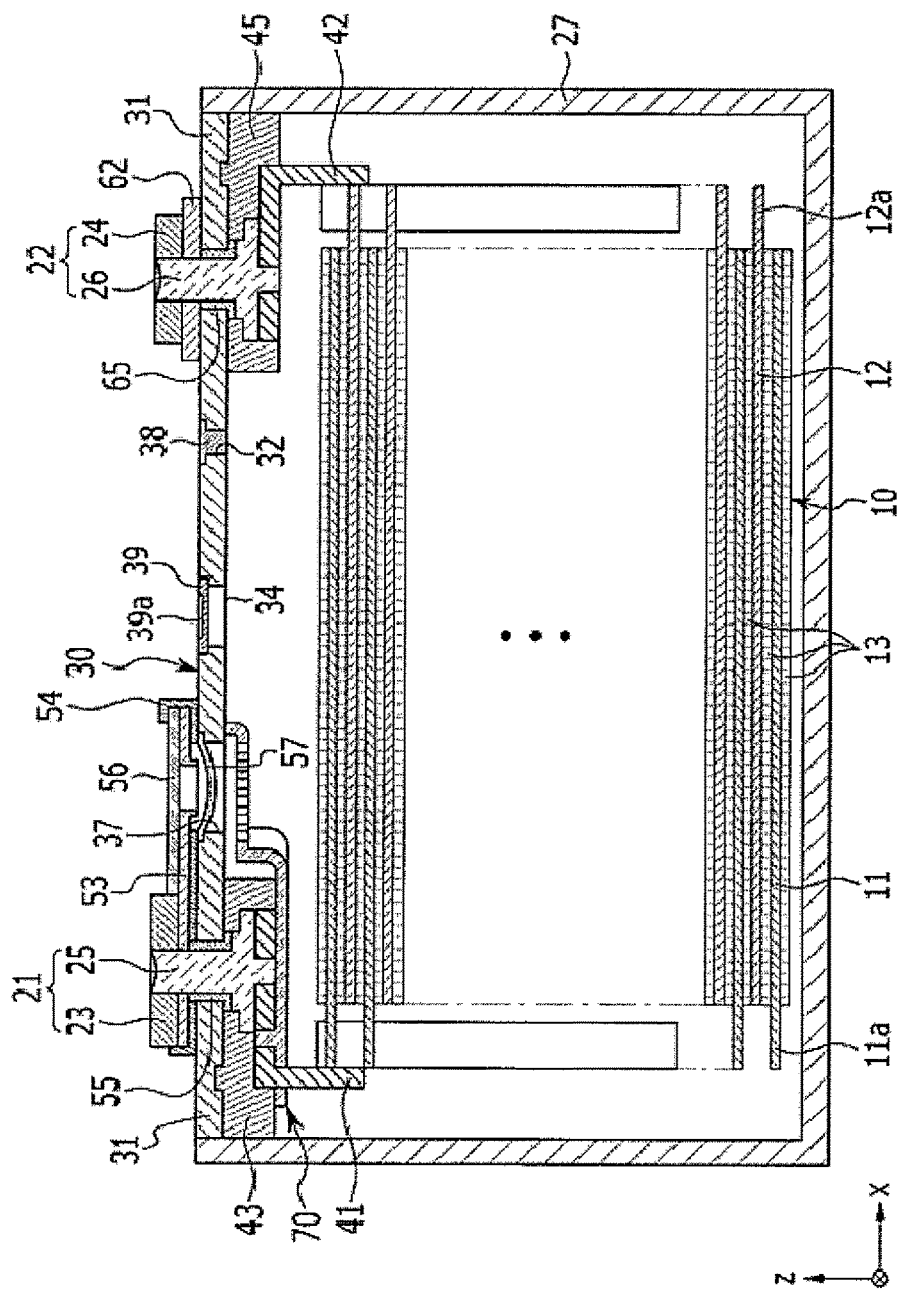
FIG. 2 is a cross-sectional view of FIG. 1, taken along the line II-II.

FIG. 1 is a perspective view of a rechargeable battery according to a first example embodiment, and FIG. 2 is a cross-sectional view of FIG. 1, taken along the line II-II.

Referring to FIG. 1 and FIG. 2, the rechargeable battery 101 according to the first example embodiment includes an electrode assembly 10 wound with a separator 13 interposed between a negative electrode 11 and a positive electrode 12, a case 27 in which the electrode assembly 10 is stored (e.g., is accommodated), and a cap assembly 30 installed at (or combined to) an opening of the case 27.

The rechargeable battery 101, according to a first example embodiment, is illustrated as a prism-shaped lithium ion rechargeable battery. However, the present invention is not limited thereto, and it can be applied to various types of batteries, such as a lithium polymer battery, and having various shapes, such as a cylindrical-shaped battery and the like.

The positive electrode 11 (e.g., a first electrode) and the negative electrode 12 (e.g., a second electrode) each include coated regions where an active material is coated on a current collector formed of a thin metal foil, and uncoated regions 11a and 12a, respectively, where the active material is not coated thereon.

The negative electrode uncoated region 11a is formed at one lateral end of the negative electrode 11 along a length direction thereof, and the positive uncoated region 12a is formed at one lateral end of the positive electrode 12 along a length direction thereof opposite to the negative electrode uncoated region 11a.

The negative electrode 11 and the positive electrode 12 are wound while the separator 13, which operates as an insulator, is interposed between them.

However, the present invention is not limited thereto, and the electrode assembly 10 may be formed in, for example, a layered structure in which a negative electrode and a positive electrode, respectively formed of a plurality of sheets, are layered while a separator is interposed between them.

The case 27 may be formed (e.g., roughly formed) in a shape of a cuboid, and an opening may be formed at one side thereof.

The case 27 may be made of a metal such as aluminum, stainless steel, and the like.

The cap assembly 30 includes a cap plate 31 covering the opening of the case 27, a first terminal 21 protruding out of the cap plate 31 and coupled to (e.g., electrically connected to) the negative electrode 11, and a second terminal 22 protruding out of the cap plate 31 and coupled to (e.g., electrically connected to) the positive electrode 12.

The cap plate 31 may be formed in an elongated plate shape along one direction and installed at (or combined to) the opening of the case 27.

The cap plate 31 includes a sealing cap 38 provided in an electrolyte injection opening 32 and a vent plate 39 provided in a vent hole 34 and formed with a notch 39a set or configured to open at a pressure (e.g., a predetermined pressure).

The first terminal 21 and the second terminal 22 are provided to protrude upward from the cap plate 31.

The first terminal 21 is coupled to (e.g., electrically connected to) the negative electrode 11 through a current collecting tab 41, and the second terminal 22 is coupled to (e.g., electrically connected to) the positive electrode 12 through a current collecting tab 42.

However, the present invention is not limited thereto, and the first terminal 21 may be coupled to (e.g., electrically connected to) the positive electrode 12, while the second terminal 22 may be coupled to (e.g., electrically connected to) the negative electrode 11.

The first terminal 21 includes an externally exposed outer terminal 23 and a connecting terminal 25 which is disposed below the outer terminal 23 and bonded to the current collecting tab 41.

The outer terminal 23 is formed in a plate shape, and the connecting terminal 25 is coupled to (e.g., fixed to) and penetrates the outer terminal 23.

Figure 3:
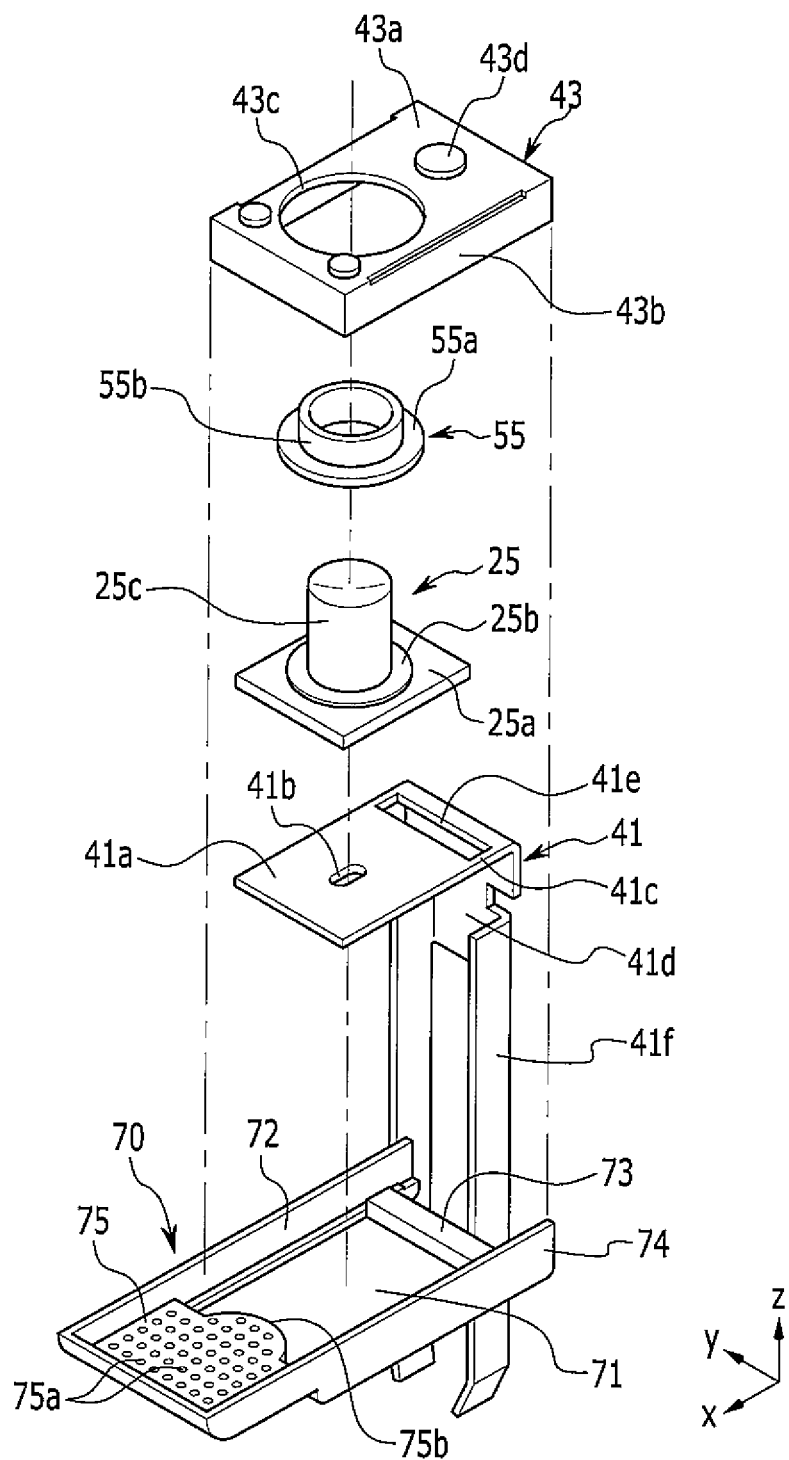
FIG. 3 is an exploded perspective view of a part of the rechargeable battery according to the first example embodiment.

As shown in FIG. 3, the connecting terminal 25 includes: a column portion 25c penetrating the cap plate 31, contacting the outer terminal 23, and being fixed thereto; a lower flange portion 25a protruding outwards from a lower end of the column portion 25c; and a stepped portion 25b formed between the lower flange portion 25a and the column portion 25c.

The stepped portion 25b is formed to protrude from the lower flange portion 25a and supports (e.g., serves to press) a gasket 55.

Figure 4:
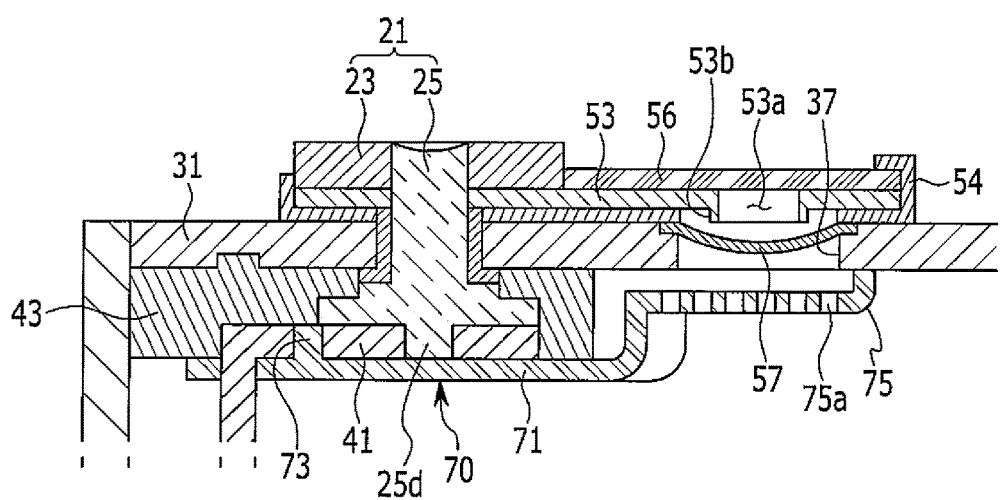
FIG. 4 is a cross-sectional view of a part of the rechargeable battery according to the first example embodiment.

A lower protrusion 25d (illustrated in FIG. 4) is formed to protrude downwards from a bottom side of the lower flange portion 25a, is inserted in the current collecting tab 41, and is then fixed thereto by, for example, welding.

The gasket 55 provided between the connecting terminal 25 and the cap plate 31 is configured to seal and is inserted into a hole that the connecting terminal 25 penetrates, and a lower insulating member 43 is provided under (e.g., below) an inner side of the cap plate 31 so as to insulate the first terminal 21 from the current collecting tab 41 at the cap plate 31.

The gasket 55 includes an upper insulating portion 55b which surrounds (e.g., encloses) the column portion 25c and a lower insulating portion 55a which contacts a top side of the stepped portion 25b.

The current collecting tab 41 includes an upper connecting portion 41a which is connected to (e.g., welded to) the lower flange portion 25a, a lower connecting portion 41d which is bent from (e.g., is perpendicular to) the upper connecting portion 41a and extends downward, and a current collecting protrusion 41f which is bent from (e.g., is perpendicular to) the lower connecting portion 41d and fixed to the negative electrode uncoated region 11a.

The upper connecting portion 41a is formed with a welding opening 41b into which the lower protrusion 25d, formed at a lower part of the lower flange portion 25a, is inserted.

The lower protrusion 25d is fixed, for example, by welding to the upper connecting portion 41a after being inserted into the welding opening 41b.

Meanwhile, the upper connecting portion 41a is formed with a fuse portion 41c which has a smaller cross-sectional area than a periphery region thereof. In other words, the cross-sectional area of the fuse portion 41c is smaller than that of adjacent regions.

The fuse portion 41c has a smaller cross-sectional area than the periphery region thereof due to a fuse opening 41e formed at the center of the fuse portion 41c.

However, the present invention is not limited thereto, and the fuse portion 41c may be formed as a groove and the like or may extend to an outer side of the fuse portion 41c.

In the present example embodiment, the fuse portion 41c formed in the current collecting tab 41 may improve safety when an excessive current flows because the current may be stopped (e.g., cut off) by melting of the fuse portion 41c.

The lower insulating member 43 includes an upper plate 43a, lateral sides 43b which protrude downward from the upper plate 43a and surround (e.g., enclose) the lower flange portion 25a and the upper connecting portion 41a, and a supporting protrusion 43d which protrudes upward from the upper plate 43a and is inserted in a groove formed in the cap plate 31.

The lower insulating member 43 is formed with an opening 43c through which the connecting terminal 25 penetrates.

Meanwhile, a short-circuit tab 53 is coupled to (e.g., electrically connected to) the first terminal 21 and is disposed on the cap plate 31.

An upper insulating member 54 is provided between and electrically insulates the short-circuit tab 53 and the cap plate 31.

The outer terminal 23 is disposed at one side of the short-circuit tab 53, and a protecting cover 56 is provided at the other side of the short-circuit tab 53.

The second terminal 22 includes an externally exposed outer terminal 24 and a connecting terminal 26.

The outer terminal 24 is formed with a plate shape, and the connecting terminal 26 penetrates the outer terminal 24 and is fixed thereto.

The connecting terminal 26 is fixed, for example, by welding to the current collecting tab 42 and penetrates the cap plate 31 such that an upper part of the connecting terminal 26 contacts the outer terminal 24 and then is fixed thereto.

A gasket 65 configured to seal the case 27 is provided between the connecting terminal 26 and the cap plate 31 by being inserted in a hole penetrated by the connecting terminal 26, and a lower insulating member 45 is provided under (e.g., below) the cap plate 31 to insulate the connecting terminal 26 from the current collecting tab 42 at the cap plate 31.

A connecting plate 62 for electrically connecting the second terminal 22 and the cap plate 31 is provided at the second terminal 22.

Because the cap assembly 30 includes a short-circuit member 57 which short-circuits (e.g., connects) the negative electrode 11 and the positive electrode 12, the short-circuit member 57 is electrically connected to the cap plate 31 which is electrically connected to the positive electrode 12 and deforms (e.g., configured to deform) to contact (e.g., to be connected to) the short-circuit tab 53 which is electrically connected to the negative electrode 11 when the internal pressure of the rechargeable battery 101 is increased (e.g., increased to a predetermined pressure).

A short-circuit opening 37 is formed in the cap plate 31, and the short-circuit member 57 is disposed between the upper insulating member 54 and the cap plate 31 at the short-circuit opening 37.

The short-circuit member 57 is made of an arc-shaped portion curving downwards and a plate portion having an edge portion thereof fixed to the cap plate 31.

The short-circuit tab 53 is provided with an upper opening 53a which is connected to the short-circuit opening 37 and disposed above the short-circuit member 57, and a reinforcing protrusion 53b is formed protruding downwards from the perimeter of the upper opening 53a.

When the short-circuit member 57 contacts the short-circuit tab 53, the short-circuit member 57 contacts the reinforcing protrusion 53b.

Thus, even when a current (e.g., an excessive current) flows through the short-circuit tab 53, the short-circuit state may be maintained (e.g., may be prevented from stopping) due to a thickness of the protrusion 53b and melting of the short-circuit tab 53.

Figure 5:
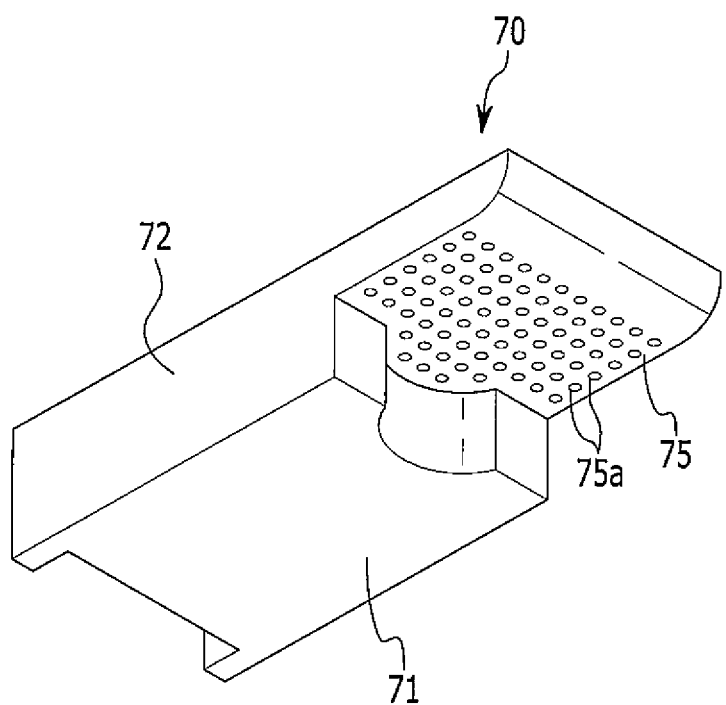
FIG. 5 is a perspective view of a blocking member of the rechargeable battery, viewed from the bottom, according to the first example embodiment.

As shown in FIG. 3 and in FIG. 5, a blocking member 70 which protects the current collecting tab 41 and the short-circuit member 57 is provided under (e.g., below) the upper connecting portion 41a and the short-circuit member 57.

The blocking member 70 may function as a pressure buffering member which buffers the pressure delivered to the short-circuit member when the internal pressure of the case 27 is changed (e.g., abruptly changed).

The blocking member 70 is provided to cover a lower surface of the upper connecting portion 41a of the current collecting tab 41 and the lower insulating member 43.

The blocking member 70 includes a lower plate 71 formed with a generally rectangular shape and a side wall 72 protruding upwards from lateral ends of the lower plate 71.

The lower plate 71 is disposed at a lower part of the first terminal 21 (e.g., below the first terminal 21), and for example, contacts a bottom side of the upper connecting portion 41a of the current collecting tab 41 (e.g., contacts a portion where the upper connecting portion 41a is attached to the current collecting tab 41).

The side wall 72 is formed to protrude from both lateral sides of the lower plate 71 and to cover (e.g., to partially cover) lateral sides 43b of the lower insulating member 43.

An opened area is formed at one side of the lower plate 71 (e.g., the side wall 72 is not formed at the one side of the lower plate 71) and extends along a direction from the current collecting tab 41 toward which the lower connecting portion 41d extends.

Protecting protrusions 74 are formed at and protrude from both lateral sides of the blocking member 70 (e.g., protrude from ends of the side wall 72), and the lower connecting portion 41d is disposed between the protecting protrusions 74.

In the present example embodiment, the protecting protrusions 74 may prevent the case 27 and the current collecting tab 41 from colliding with or contacting each other when an external impact is delivered, such that the current collecting tab 41 may be stably connected to (e.g., combined with) the first terminal 21 and short-circuiting of (e.g., connecting or contacting) the case 27 and the current collecting tab 41 may be prevented at the same time.

A fuse protrusion 73 protrudes from the lower plate 71 of the blocking member 70 and is inserted into the fuse opening 41e.

The fuse protrusion 73 is formed to support the fuse portion 41c to be in a separated state (e.g., to separate) after melting.

After the fuse portion 41c melts, the upper connecting portion 41a and the lower flange portion 25a may become connected again or may contact each other when external vibration and impact are delivered.

When the upper connecting portion 41a is reconnected or contacts the lower flange portion 25a, as described above, the rechargeable battery 101 may catch fire and explode due to arc generation or over-current.

However, in the present example embodiment, because the fuse protrusion 73 is inserted in the fuse opening 41e, the upper connecting portion 41a may be prevented from being reconnected or contacting the lower flange portion 25a.

The blocking member 70 may be made of a polymer, for example, an elastic polymer, which does not react with an electrolyte solution and is electrically insulative.

A blocking portion 75, disposed below the short-circuit member 57 (e.g., at the lower portion of the short-circuit member 57), is connected at and extends from a side end of the lower plate 71 in a direction from the lower plate 71 toward the center of the cap plate 31.

A plurality of openings 75a are formed in the blocking portion 75, and their diameters are, for example, less than about 1 mm.

The blocking member 75 is formed to cover (e.g., enclose) a lower surface of the short-circuit member 57.

A convex portion 75b is formed protruding toward the lower plate 71 at a connecting part of the blocking portion 75 and the lower plate 71.

The blocking portion 75 may be above the lower plate 71. In other words, the blocking portion 75 may be disposed closer to the cap plate 31 than the lower plate 71.

The blocking member 70 may not only prevent the current collecting tab 41 from contacting the case 27, but may also prevent the inversion of the short-circuit member 57 due to a pressure variation (e.g., a sudden pressure variation) inside the case 27.

The short-circuit member 57 may be inverted when the internal pressure of the case 27 is increased to a value (e.g., a predetermined value) to cause an internal short-circuit.

However, when an external short-circuit occurs, the fuse portion 41c may melt, and a second arc may be generated thereafter.

When the second arc is generated, pressure variation in the case 27 may occur abruptly due to steam pressure and the like, and in this case, another arc may be generated due to the inversion of the short-circuit member 57.

A local pressure variation inside the case 27 does not trigger an overall pressure variation therein, and the internal pressure of the case 27 may be maintained below the value (e.g., the predetermined value) to cause the short-circuit member 57 to be inverted if the locally concentrated pressure is distributed to other remaining areas.

Therefore, the short-circuit member 57 may not be inverted when the pressure is locally increased.

However, when the short-circuit member 57 is inverted by, for example, sudden pressure variation, the safety of the rechargeable battery 101 may be deteriorated by arc generation and the like.

Moreover, when the rechargeable battery 101 is charged above a voltage (e.g., a predetermined voltage), that is, overcharged, pressure variation inside the case 27 may occur abruptly, and the internal pressure of the case 27 may be decreased again if an overcharge safety apparatus operates.

Therefore, when the short-circuit member 57 is inverted due to pressure variation when the rechargeable battery 101 is slightly overcharged, it creates an internal short-circuit and thereby changes the state of the rechargeable battery 101 to be unfit for use.

However, in the present example embodiment, when the blocking member 70 is provided with a plurality of openings 75a (e.g., small or tiny holes) at the lower surface of the short-circuit member 57, the blocking member 70 may buffer the pressure delivered to the short-circuit member 57 and not directly apply the sudden pressure variation to the short-circuit member 57.

When internal gas moves to the short-circuit member 57 due to pressure variation, application of pressure to the short-circuit member 57 is delayed due to its passage through the openings 75a, and the short-circuit member 57 may not be deformed (e.g., may not be inverted) and may remain in a stable state if the local pressure variation ceases to exist.

Figure 6:
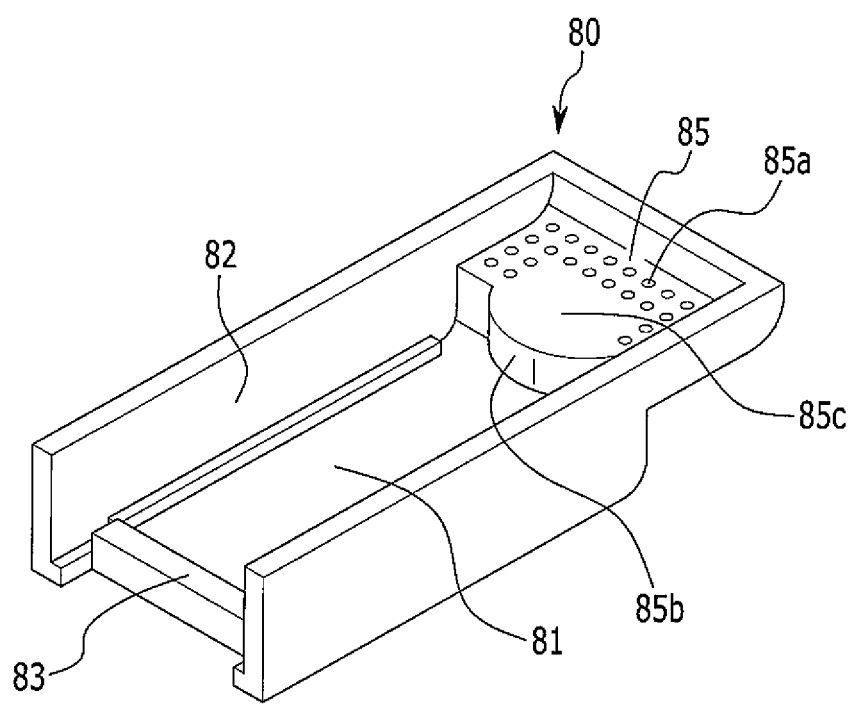
FIG. 6 is a perspective view of a blocking member of a rechargeable battery according to a second example embodiment.

FIG. 6 is a perspective view of a blocking member of a rechargeable battery according to a second example embodiment.

Referring to FIG. 6, the rechargeable battery according to the second example embodiment is the same in its structure as the first example embodiment, except for the structure of the blocking member, and the description of the same structure will be omitted.

A blocking member 80 includes a lower plate 81 formed in a generally square plate shape and a side wall 82 protruding upward from lateral ends of the lower plate 81.

The side wall 82 is formed to protrude from (e.g., to extend from) both lateral sides of the lower plate 81, and there is an opened area at one side of the lower plate 81 (e.g., the side wall 82 is not formed at the one side of the lower plate 81) and it extends in a direction from the current collecting tab 41 toward where the lower connecting portion 41d extends.

A fuse protrusion 83 protrudes from the lower plate 81 of the blocking member 70 and is inserted in the fuse opening 41e.

The fuse protrusion 83 supports the fuse portion 41c to be in a separated state (e.g., to separate) after melting.

A blocking portion 85, disposed below the short-circuit member 57 (e.g., at the lower surface of the short-circuit member 57), is connected at and extends from a side end of the lower plate 81 along a direction from the lower plate 81 toward the center of the cap plate 31.

A plurality of openings 85a are formed in the blocking portion 85, and their diameters may be, for example, less than about 1 mm.

The blocking portion 85 is formed to cover (or enclose) the lower surface of the short-circuit member 57.

A convex portion 85b is formed protruding toward the lower plate 71 at a connecting part of the blocking portion 85 and the lower plate 81.

The blocking portion 85 is above the lower plate 81, that is, the blocking portion 85 may be closer to the cap plate 31 than the lower plate 81.

The blocking portion 85 includes a protecting portion 85c which does not have openings 85a, and the protecting portion 85c is disposed at a lower central portion of the short-circuit member 57 (e.g., is disposed below a center portion of the short-circuit member 57).

The blocking portion 85 is disposed at a lower surface of the short-circuit member 57 and its vicinity thereof, and the protecting portion 85c is disposed below (e.g., vertically under) the short-circuit member 57 such that it functions to delay pressure variation inside the case 27.

The width of the protecting portion 85c is set, for example, in consideration of voltage and capacity of the rechargeable battery 101.

As described above, the blocking portion 85 and the protecting portion 85c may buffer a sudden pressure variation inside the case 27 and thereby deliver the buffered pressure to the short-circuit member 57.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims and their equivalents.

DESCRIPTION OF SYMBOLS

| | |
|---|---|
| 101: rechargeable battery | 10: electrode assembly |
| 11: negative electrode | 11a: negative electrode uncoated region |
| 12: positive electrode | 12a: positive electrode uncoated region |
| 13: separator | 21: first terminal |
| 22: second terminal | 23, 24: outer terminal |
| 25, 26: connecting terminal | 27: case |
| 30: cap assembly | 31: cap plate |
| 34: vent hole | 37: short-circuit hole |
| 38: sealing cap | 39: vent plate |
| 41, 42: current collecting tab | 43, 45: lower insulating member |
| 53: short-circuit tab | 54: upper insulating member |
| 56: protecting cover | 57: short-circuit member |
| 62: connecting plate | 70, 80: blocking member |
| 71, 81: lower plate | 72, 82: side wall |
| 73, 83: fuse protrusion | 74: protecting protrusion |
| 75, 85: blocking portion | 75a, 85a: hole |
| 75b, 85b: convex portion | 85c: protecting portion |

What is claimed is:

1. A rechargeable battery comprising:
   an electrode assembly comprising a first electrode and a second electrode;
   a case accommodating the electrode assembly;
   a cap plate coupled to the case, the cap plate having a vent opening and a short-circuit opening;
   a terminal electrically connected to the first electrode and protruding out of the cap plate;
   a current collecting tab electrically connecting the terminal and the first electrode, the current collecting tab having a fuse opening;
   a short-circuit member at the short-circuit opening in the cap plate, the short-circuit member being configured to deform to electrically connect the first electrode and the second electrode;
   a lower insulating member at an inner side of the cap plate and configured to insulate the cap plate from the terminal; and
   a blocking member below the short-circuit opening and having a plurality of openings and a fusing protrusion extending into the fuse opening of the current collecting tab, a proximal end of the blocking member contacting the lower insulating member and a distal end of the blocking member being between the short-circuit opening and the vent opening.

2. The rechargeable battery of claim 1, wherein the blocking member comprises a lower plate below a portion of the terminal and a blocking portion below the short-circuit member, and wherein the blocking portion has the plurality of openings.

3. The rechargeable battery of claim 2,
   wherein the blocking member covers an end of the lower insulating member.

4. The rechargeable battery of claim 3, wherein a side wall extends from both lateral sides of the lower plate and covers lateral sides of the lower insulating member.

5. The rechargeable battery of claim 2,
   wherein a protecting protrusion extends from ends of a side wall of the blocking member past the current collecting tab.

6. The rechargeable battery of claim 2, wherein the blocking member further comprises a connecting part connecting the blocking portion and the lower plate, and
   wherein the connecting part has a convex portion extending toward the lower plate.

7. The rechargeable battery of claim 2, wherein the blocking portion covers a lower surface of the short-circuit member.

8. The rechargeable battery of claim 2, wherein a distance between the blocking portion and the cap plate is less than a distance between the lower plate and the cap plate.

9. The rechargeable battery of claim 1, wherein the cap plate is electrically connected to the second electrode,
   the short-circuit member is electrically connected to the cap plate, and
   a short-circuit tab is at an upper part of the short-circuit member and electrically connected to the first electrode.

10. The rechargeable battery of claim 9, wherein the short-circuit tab is on the cap plate, and an upper insulating member is between the short-circuit tab and the cap plate.

11. The rechargeable battery of claim 9, wherein the short-circuit tab has an upper opening above the short-circuit member and a reinforcing protrusion around a perimeter of the upper opening and extending into the short-circuit opening.

12. The rechargeable battery of claim 2, wherein the blocking member comprises at least three side walls extending from edges of the blocking portion toward the cap plate.

* * * * *